(12) United States Patent
Yasin et al.

(10) Patent No.: US 10,374,297 B2
(45) Date of Patent: Aug. 6, 2019

(54) ANTENNA ASSEMBLIES HAVING SEALED CAMERAS

(71) Applicant: Laird Technologies, Inc., Earth City, MO (US)

(72) Inventors: Hasan Yasin, Grand Blanc, MI (US); Wassim Borchani, Grand Blanc, MI (US)

( * ) Notice: Subject to any disclaimer, the term of this patent is extended or adjusted under 35 U.S.C. 154(b) by 198 days.

(21) Appl. No.: 15/725,676

(22) Filed: Oct. 5, 2017

(65) Prior Publication Data

US 2019/0081391 A1   Mar. 14, 2019

Related U.S. Application Data

(60) Provisional application No. 62/557,578, filed on Sep. 12, 2017.

(51) Int. Cl.
*H01Q 1/42* (2006.01)
*H01Q 1/32* (2006.01)
(Continued)

(52) U.S. Cl.
CPC .......... *H01Q 1/3233* (2013.01); *B60R 11/04* (2013.01); *G03B 17/08* (2013.01); *G03B 29/00* (2013.01);
(Continued)

(58) Field of Classification Search
CPC ...... H01Q 1/3233; H01Q 1/3275; H01Q 1/42; B60R 11/04; B60R 1/12;
(Continued)

(56) References Cited

U.S. PATENT DOCUMENTS 7,990,325 B2   8/2011   Hunton et al.
8,558,886 B1   10/2013  Borjas
(Continued)

FOREIGN PATENT DOCUMENTS

CN   201522273 U   7/2010
CN   104979631 A   10/2015
(Continued)

OTHER PUBLICATIONS

European Search report dated Jan. 23, 2019 for EP application No. 1819587.3 which claims priority to the instant application, 8 pages.
(Continued)

*Primary Examiner* — Graham P Smith
(74) *Attorney, Agent, or Firm* — Harness, Dickey & Pierce, P.L.C.; Anthony G. Fussner

(57) ABSTRACT

An antenna assembly includes a radome, a camera, and a plug assembly. The radome defines an opening. The camera is positionable at least partially within the opening. The camera and the radome define a passage when the camera is positioned at least partially within the opening of the radome. The plug assembly is positionable at least partially within the passage. The plug assembly includes a plug having one or more first coupling structures and a seal having one or more second coupling structures. At least one of the first coupling structures and at least one of the second coupling structures are mateable to detachably couple the seal to the plug to substantially prevent contaminants from passing into the radome via the opening of the radome. Other antenna assemblies, plug assemblies, and methods relating to assembling antenna assemblies and/or plug assemblies are also disclosed.

20 Claims, 7 Drawing Sheets

(51) Int. Cl.
  *B60R 11/04* (2006.01)
  *G03B 17/08* (2006.01)
  *H04N 5/225* (2006.01)
  *G03B 29/00* (2006.01)
  *G02B 7/02* (2006.01)
  *B60R 1/12* (2006.01)
  *B60R 11/00* (2006.01)

(52) U.S. Cl.
  CPC .............. *H01Q 1/42* (2013.01); *H04N 5/2252* (2013.01); *H04N 5/2253* (2013.01); *B60R 1/12* (2013.01); *B60R 2001/1253* (2013.01); *B60R 2011/004* (2013.01); *G02B 7/022* (2013.01); *H01Q 1/3275* (2013.01)

(58) Field of Classification Search
  CPC ...... B60R 2001/1253; B60R 2011/004; G03B 17/08; G03B 29/00; G03B 7/022; H04N 5/2252; H04N 5/2253
  See application file for complete search history.

(56) References Cited

U.S. PATENT DOCUMENTS

| | | |
|---|---|---|
| 9,024,804 B2 | 5/2015 | Shi et al. |
| 2006/0063399 A1 | 3/2006 | Li |
| 2010/0091179 A1 | 4/2010 | Murakami et al. |
| 2012/0327234 A1 | 12/2012 | Fish, Jr. et al. |
| 2014/0158731 A1 | 6/2014 | Squire et al. |
| 2014/0354064 A1 | 12/2014 | Tseliakhovich |
| 2015/0188226 A1 | 7/2015 | Ng et al. |
| 2017/0033449 A1 | 2/2017 | Talty et al. |
| 2017/0214130 A1 | 7/2017 | Grimes et al. |

FOREIGN PATENT DOCUMENTS

| | | |
|---|---|---|
| CN | 204793188 U | 11/2015 |
| DE | 102009012615 A1 | 9/2010 |
| DE | 202014004364 U1 | 8/2014 |
| DE | 102013019226 A1 | 5/2015 |
| DE | 102016006802 A1 | 12/2016 |
| EP | 2407350 A2 | 1/2012 |
| KR | 1020100137883 | 12/2010 |
| KR | 101052796 B1 | 7/2011 |
| KR | 200455494 Y1 | 9/2011 |
| KR | 101550715 B1 | 9/2015 |
| WO | WO-2015003384 A1 | 1/2015 |
| WO | WO-2016093084 A1 | 6/2016 |

OTHER PUBLICATIONS

Virtual Ground—Wikipedia, the free encyclopedia, https://en.wikipedia.org/wiki/virtual_ground, last modified Apr. 20, 2016, 3 pages.

ANTENNA ASSEMBLIES HAVING SEALED CAMERAS

CROSS-REFERENCE TO RELATED APPLICATION

This application claims the benefit and priority of U.S. Provisional Patent Application 62/557,578 filed Sep. 12, 2017. The entire disclosure of the referenced application is incorporated herein by reference.

FIELD

The present disclosure relates to antenna assemblies having sealed cameras.

BACKGROUND

This section provides background information related to the present disclosure which is not necessarily prior art.

Vehicles may include an antenna assembly including a radome and one or more antennas housed within the radome. Sometimes, the antenna assembly may also include a camera housed within the radome. Other times, the antenna assembly and the camera may be separated from each other.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
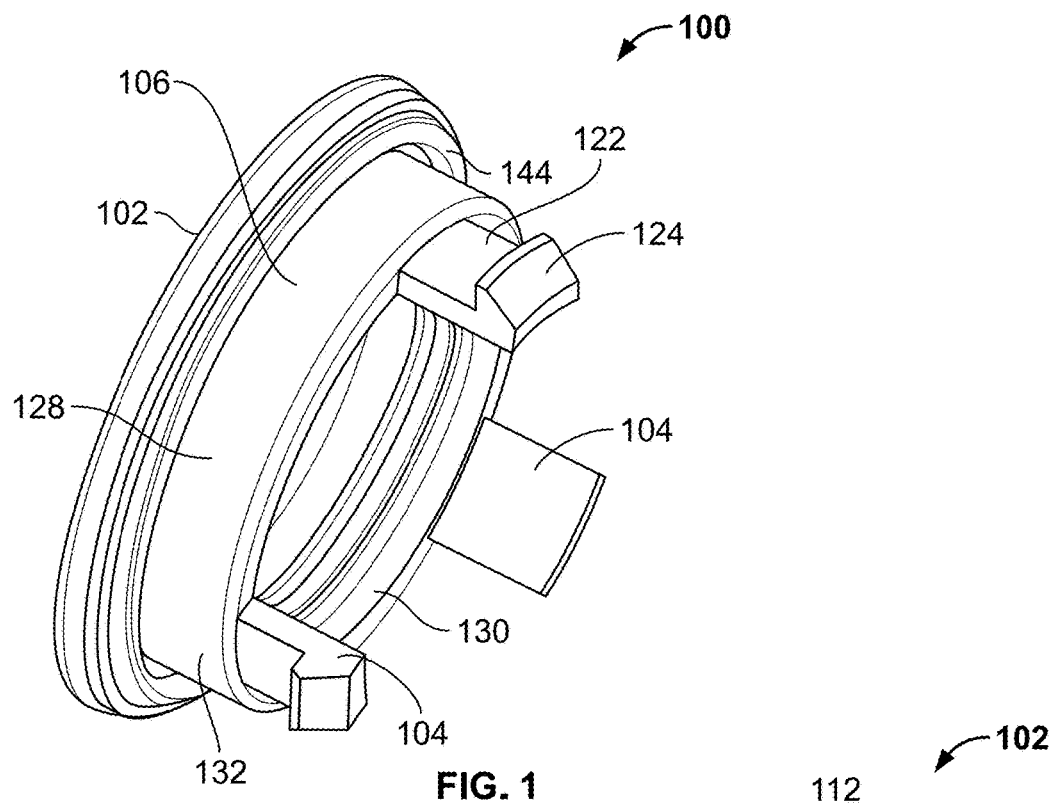
FIG. 1 is an isometric view of a plug assembly including a plug having protrusions and a seal having openings for receiving the protrusions according to one example embodiment of the present disclosure.

A plug assembly for use in an antenna assembly according to one example embodiment of the present disclosure is illustrated in FIG. 1, and indicated generally by reference number 100. As shown in FIGS. 1-6, the plug assembly 100 includes a plug 102 having one or more coupling structures 104 and a seal 106 having one or more coupling structures 108. At least one coupling structure 104 of the plug 102 and at least one coupling structure 108 of the seal 106 are mateable to detachably couple the seal 106 to the plug 102.

For example, and as further explained below, the antenna assembly may include a radome defining an opening, a camera positioned at least partially within the opening of the radome, and the plug assembly 100 positioned in a passage defined by the camera and the radome to substantially prevent contaminants from passing into the radome via the opening of the radome. As such, contaminants such as debris (e.g., dirt, dust, etc.), moisture, etc. that may otherwise enter the antenna assembly through the radome's opening may be restricted from entering the antenna assembly, and damaging components housed in the antenna assembly, as further explained below.

In the particular embodiment of FIGS. 1-6, the coupling structure(s) 104 of the plug 102 include three protrusions (hereinafter the protrusions 104), and the coupling structure(s) 108 of the seal 106 include three openings (hereinafter the openings 108) defined by the seal 106 for receiving the three protrusions 104. In other embodiments, the plug 102 may include more or less protrusions 104, and/or the seal 106 may include more or less openings 108. For example, the plug 102 may include two protrusions and the seal 106 may include three openings. Additionally, the plug 102 may include one or more openings and/or another suitable structure for mating with the seal's coupling structure(s), and the seal 106 may include one or more protrusions, and/or another suitable structure for mating with the plug's coupling structure(s).

Figure 2:
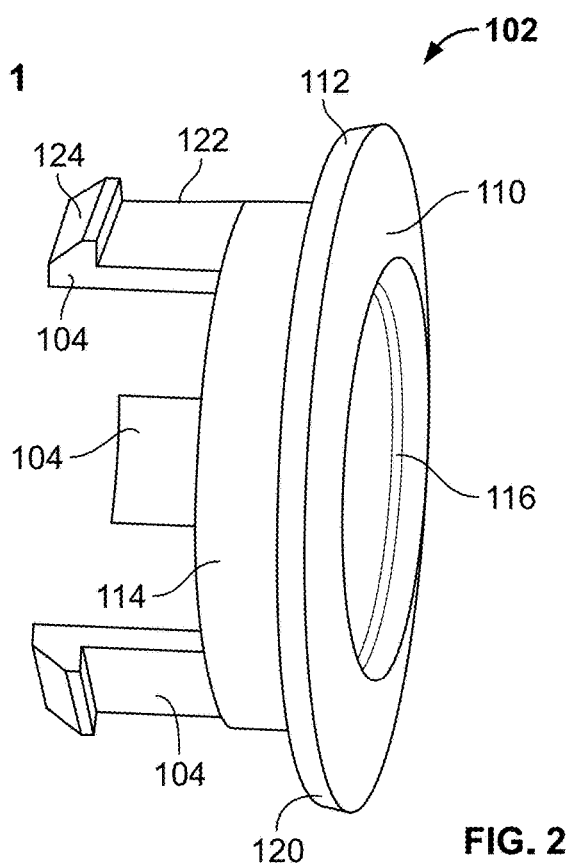
FIG. 2 is an isometric side view of the plug of FIG. 1.
Figure 3:
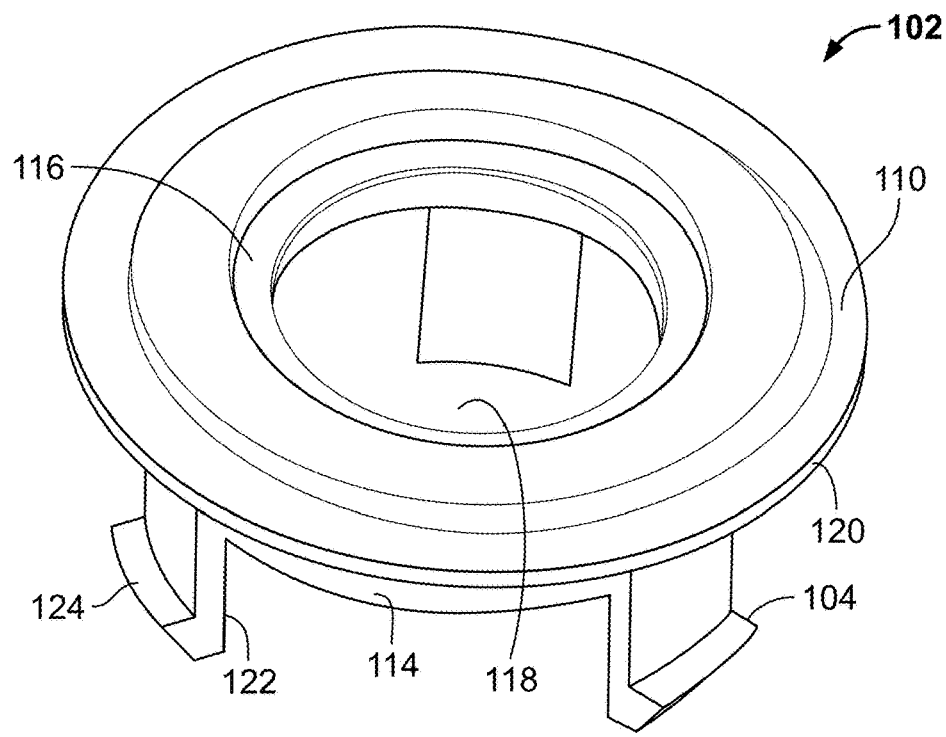
FIG. 3 is an isometric top view of the plug of FIG. 1.
Figure 4:
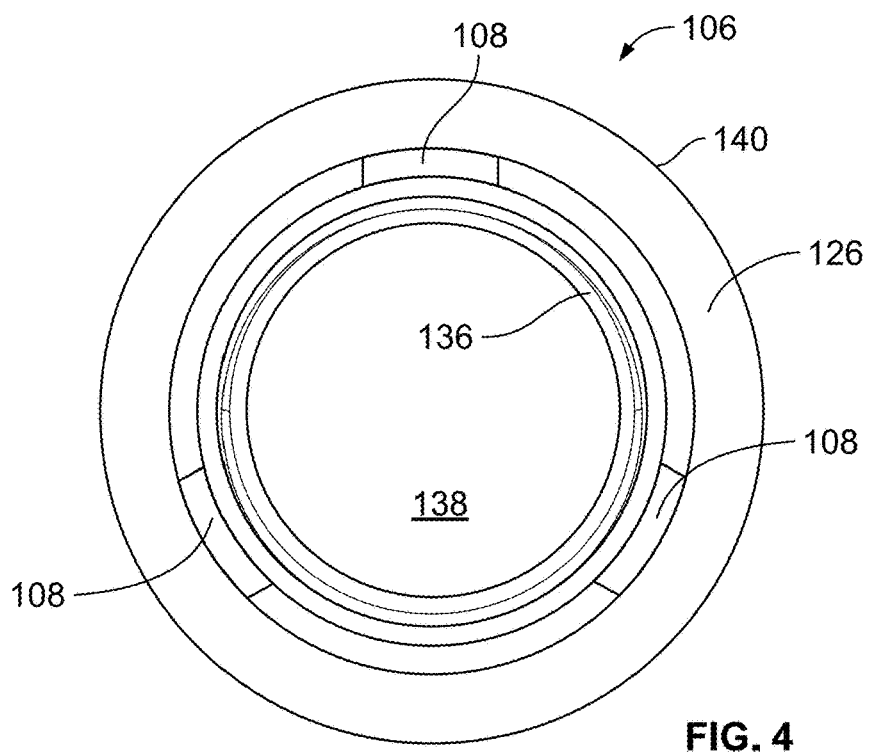
FIG. 4 is a bottom view of the seal of FIG. 1.
Figure 5:
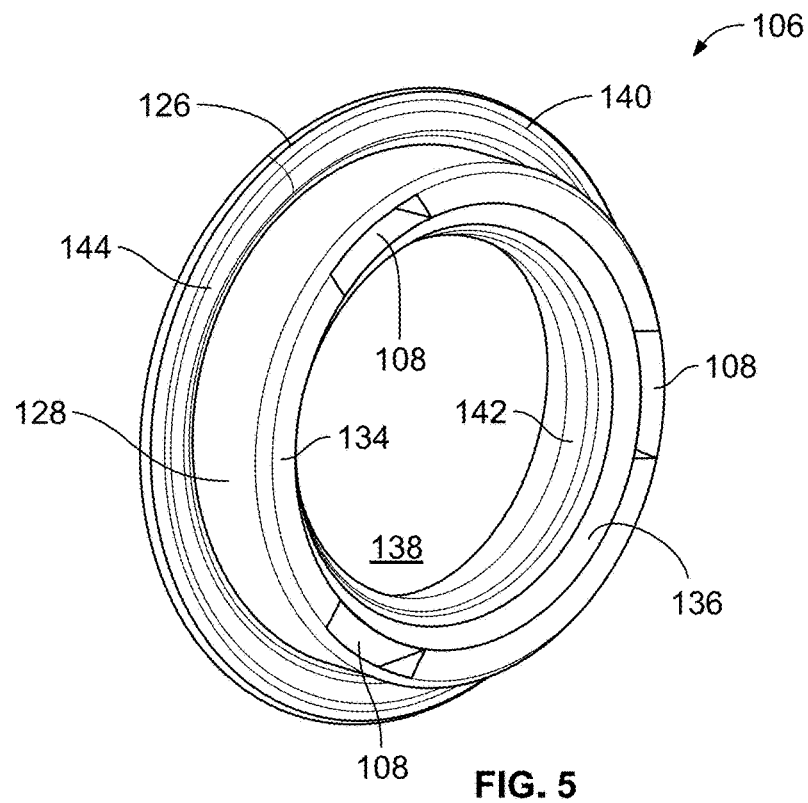
FIG. 5 is an isometric front view of the seal of FIG. 1.
Figure 6:
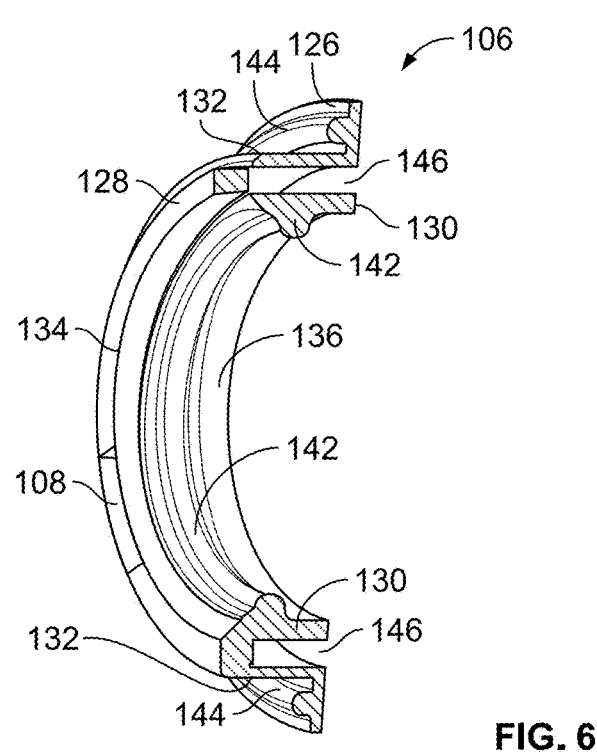
FIG. 6 is a cross sectional isometric view of the seal of FIG. 1.

The protrusions 104 of FIGS. 1-3 each include an arm 122 and a flange 124 (e.g., a catch, a clip, a latch, etc.). For example, each arm 122 includes an end adjacent a base 110 of the plug 102 and an opposing distal end. Each flange 124 may be positioned adjacent the distal end of its corresponding arm 122. Additionally, each of the flanges 124 may have the same size and/or shape. For example, and as shown in FIGS. 1-3, each flange 124 may include a surface extending substantially perpendicular to the arm 122, and a sloped surface extending from the perpendicular surface. In other embodiments, one or more of the protrusions 104 may not include a flange, may include another suitable structure instead of the flange 124, flanges of different sizes and/or shapes, etc.

Additionally, and as further explained below, the protrusions 104 may be resilient for assisting in coupling the plug assembly 100 to an antenna assembly. For example, a user such as an individual, machine, etc. can manipulate (e.g., bend, flex, deform, etc.) the protrusions 104 to couple the plug assembly 100 to a radome. After which, the protrusions 104 can return to their non-manipulated state (e.g., a steady state, original state, etc.). If it is desired to remove the plug assembly 100, the user can again manipulate the protrusions 104 to decouple the plug assembly 100 from the radome. This allows the plug assembly 100 to snap or latch into and/or out of place when coupled to the radome.

As shown in FIGS. 1-3, the plug 102 is substantially ring-shaped. For example, the base 110 includes an inner perimeter 116 defining an opening 118 (e.g., a circular opening, etc.), and an outer perimeter 120. When installed in an antenna assembly, the camera may be positioned adjacent to the inner perimeter 116, and sometimes forced against an area of the plug 102 between the inner perimeter 116 and the outer perimeter 120, thereby allowing the camera's lens to have a viewing window through the opening 118. In such examples, the ring-shaped plug 102 may be considered a bezel or the like. In other embodiments, the plug 102 may form another suitable shape if desired to accommodate, for example, a camera of an antenna assembly, another seal, etc.

Additionally, the protrusions 104 may extend from the base 110 of the plug 102. For example, and as shown in FIGS. 2 and 3, the base 110 may include a platform 112 and a ridge 114 extending from the platform 112. As shown, the protrusions 104 extend from the ridge 114 of the base 110, and adjacent to the inner perimeter 116. In other embodiments, the base 110 may not include the ridge 114 and/or the platform 112, or may include another suitable structure instead of the ridge 114 and/or the platform 112. Additionally, in some examples the protrusions 104 may extend directly from the platform 112 of the base 110.

In the particular embodiment of FIGS. 1-6, each of the plug's protrusions 104 and each of the seal's openings 108 are substantially aligned with each other when the plug 102 and the seal 106 are coupled together. For example, the three protrusions 104 of FIGS. 1-3 may be equally spaced about the plug 102, and the three openings 108 of FIGS. 1 and 4-6 may be equally spaced about the seal 106. In other embodiments, the protrusions 104 and the openings 108 may be substantially aligned even though the protrusions 104 may not be equally spaced apart from each other and even though the openings 108 may not be equally spaced apart from each other.

As shown in FIGS. 1 and 4-6, the seal 106 may include a base 126 and a ridge 128 extending from the base 126. For example, the ridge 128 may include two sides 130, 132 extending substantially parallel with each other, and a top 134 (e.g., a crest, etc.) extending between the parallel sides 130, 132. As shown, the parallel sides 130, 132 and the top 134 define a passageway 146 for receiving the plug's ridge 114. In some embodiments, the openings 108 of the seal 106 may be defined by the ridge 128 (e.g., the top 134) of the seal 106. In other embodiments, the seal's openings 108 may be positioned in another suitable portion of the seal 106 (e.g., the base 126) if desired.

Additionally, the base 126 and the ridge 128 of the seal 106 may have substantially the same size, shape, etc. as the base 110 and the ridge 114 of the plug 102, respectively. For example, the seal 106 may include an inner perimeter 136 defining an opening 138 (e.g., a circular opening, etc.), and an outer perimeter 140. The size, shape, etc. of the seal's inner perimeter 136, opening 138, and outer perimeter 140 may be substantially the same as the plug's inner perimeter 116, opening 118, and outer perimeter 120, respectively. Likewise, the ridge's sides 130, 132 and top 134 of the seal 106 may correspond to the ridge's outer surfaces and top surface of the plug 102. This may allow the seal's passageway 146 to receive the plug's ridge 114 when the plug 102 and the seal 106 are coupled together.

In the specific example of FIGS. 1 and 4-6, the seal 106 extends completely around the plug 102 to substantially prevent or inhibit contaminants from passing into a radome. This may provide a friction fit or interference fit between the seal 106 and the plug 102, a casing of the camera, etc. In other embodiments, the seal 106 may be segmented if, for example, the plug 102 provides a sufficient seal with the camera to prevent or inhibit contaminants from entering the antenna assembly.

Further, and as shown in the particular embodiment of FIGS. 1 and 4-6, the seal 106 includes outwardly protruding portions or protrusions (e.g., bumps, etc.) extending outwardly from sides of the seal 106. For example, the seal 106 includes a protrusion 142 extending about the inner perimeter 136 (and into the opening 138), and another protrusion 144 extending adjacent the outer perimeter 140. The protrusions 142, 144 may be made out of a flexible material, such as silicone, etc. As further explained below, the protrusions 142, 144 may be compressed to help seal an antenna assembly, hold a camera in place, etc. when the plug assembly 100 is installed in the antenna assembly.

The protrusions 142, 144 may extend completely around the seal 106. For example, and as shown in FIGS. 1 and 4-6, the protrusion 142 extends completely around the seal's inner perimeter 136, and the protrusion 144 extends completely around an area adjacent to the seal's outer perimeter 140. In other embodiments, one or both protrusions 142, 144 may not extend completely around the seal 106. For example, the protrusion 142 and/or the protrusion 144 may be segmented around the seal 106 if desired.

Figure 8:
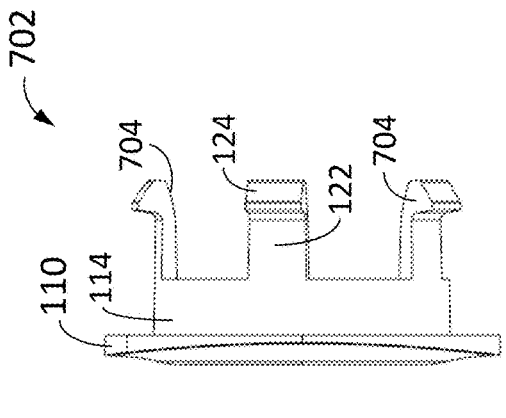
FIG. 8 is a side view of the plug of FIG. 7.
Figure 10:
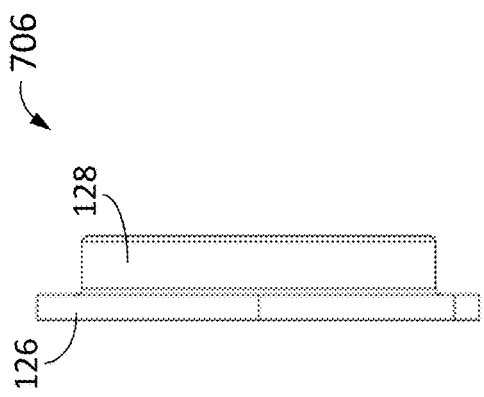
FIG. 10 is a side view of the seal plug of FIG. 9.

FIGS. 7-10 illustrate a plug 702 and a seal 706 that are substantially similar to the plug 102 and the seal 106 of FIGS. 1-6. For example, the plug 702 and the seal 706 of FIGS. 7-10 may be detachably coupled together to form a plug assembly. Additionally, the plug 702 includes the base 110 and the ridge 114 of FIGS. 1-3, and five protrusions 704. Likewise, the seal 706 includes the base 126 and the ridge 128 of FIGS. 1 and 4-6, and five openings 708 for receiving the protrusions 704. The protrusions 704 may be substantially similar to the protrusions 104 of FIGS. 1-3. The openings 708 may be substantially similar to the openings 108 of FIGS. 1 and 4-6. For example, and as shown in FIG. 8, the protrusions 704 each include the arm 122 and the flange 124 as explained above with reference to FIGS. 1-3.

Figure 7:
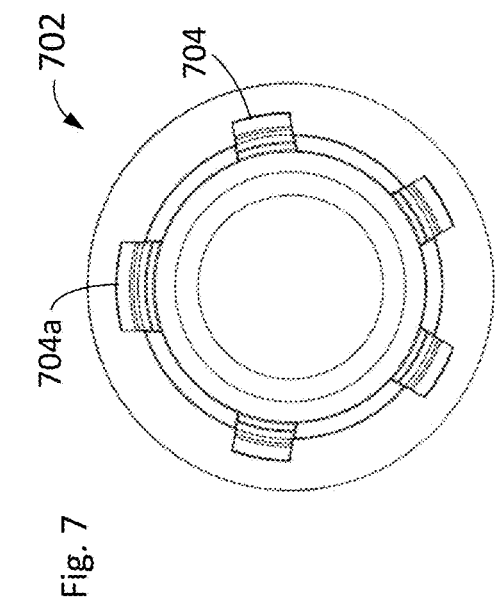
FIG. 7 is a top view of a plug having five protrusions for a plug assembly according to another example embodiment.
Figure 9:
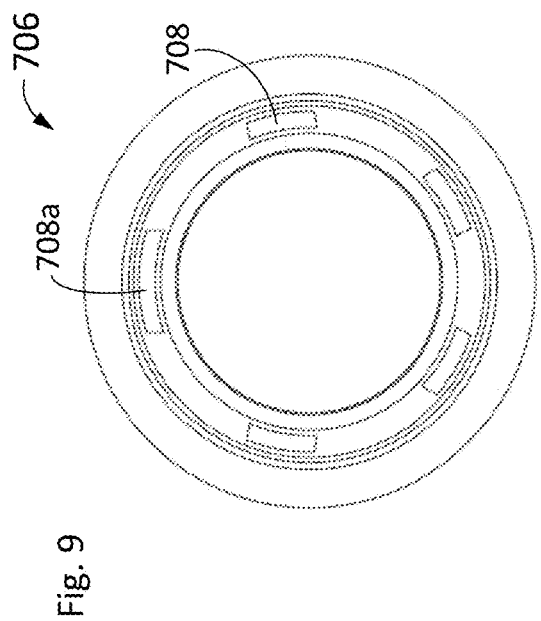
FIG. 9 is a top view of a seal having five openings for a plug assembly according to yet another example embodiment.

As shown in FIGS. 7-10, the protrusions 704 and the openings 708 have different sizes. For example, the protrusion 704a has a width that is different than the width of the other four protrusions 704. Specifically, and as shown in FIG. 7, the distance between opposing edges (e.g., the width) of the protrusion 704a is larger than the distance between opposing edges of the other four protrusions 704. Similar to the protrusion 704a, the opening 708a has a width that is different than the width of the other four openings 708. In particular, the distance between opposing sides (e.g., the width) of the opening 708a is larger than the distance between opposing sides of the other four openings 708. Additionally, the width of the other four openings 708 may be substantially equal, and the width of the other four protrusions 704 may be substantially equal.

In the particular embodiment of FIGS. 7-10, the width of the opening 708a corresponds to and aligns with the width of the protrusion 704a, and the widths of the other four openings 708 correspond to and align with the width of the other four protrusions 704. As such, the five protrusions 704 may substantially align with the five openings 708 in one configuration when the plug 702 and the seal 706 are coupled together. This may allow a user to quickly align and couple the plug 702 and the seal 706 together, prevent a user from coupling the plug 702 and the seal 706 incorrectly, etc.

Figure 11:
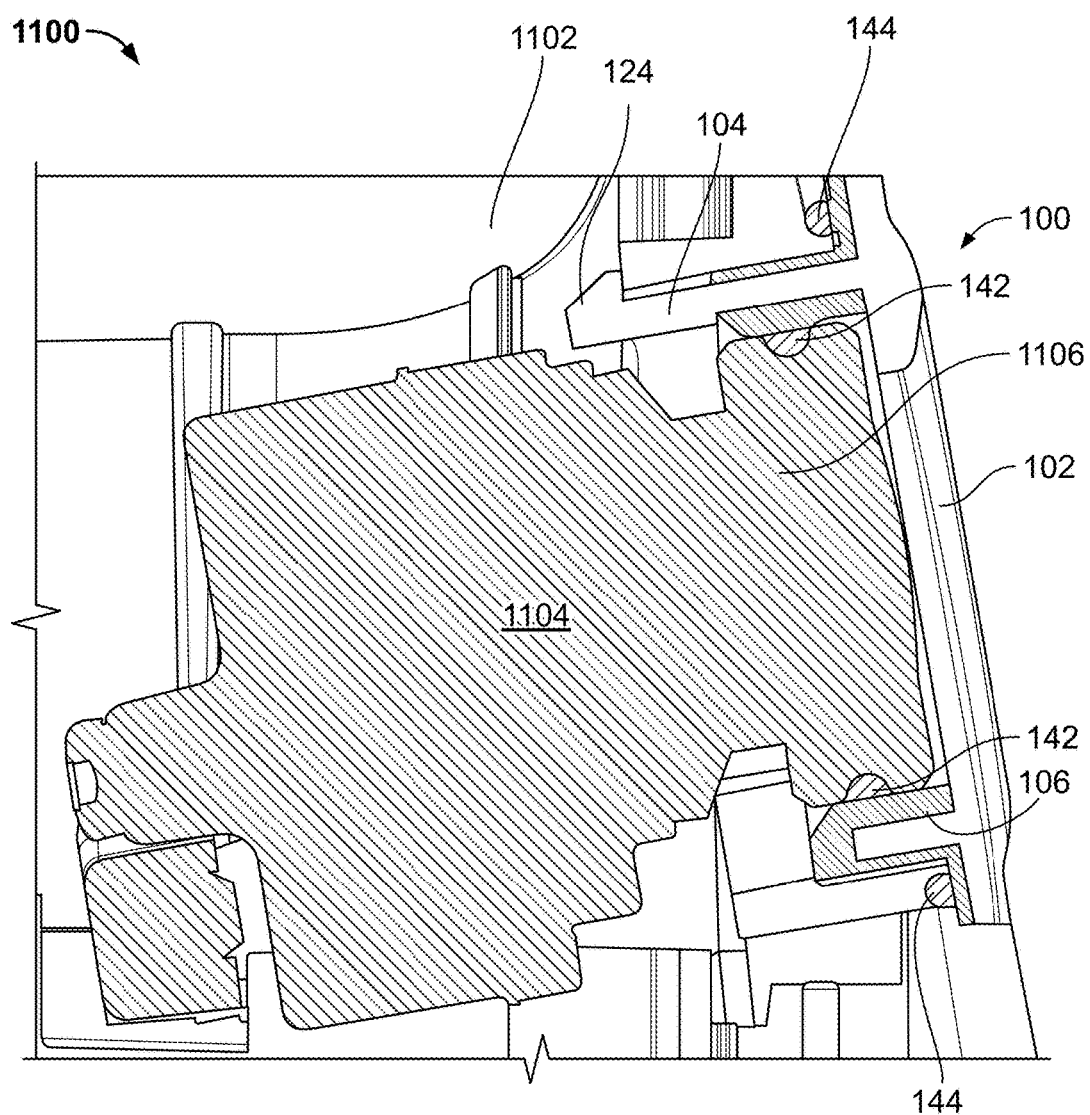
FIG. 11 is a cross sectional side view of a portion of an antenna assembly including a radome, a camera, and the plug assembly of FIG. 1, according to another example embodiment.

As explained above, any one of the plug assemblies (e.g., the plug assembly 100, the plug assembly including the plug 702 and the seal 706, etc.) may be employed in an antenna assembly. For example, FIG. 11 illustrates an antenna assembly 1100 including a portion of a radome 1102 defining an opening 1106 extending between the radome's interior surface and exterior surface, a camera 1104 positionable at least partially within the radome's opening 1106, and the plug assembly 100 of FIG. 1. The plug assembly 100 is positioned in a passage defined by an exterior surface of the camera 1104 and an interior surface of the radome 1102

As shown in FIG. 11, the plug assembly 100 may be coupled to the radome 1102. In such examples, the plug assembly 100 may be detachably coupled to the radome 1102 via one or more components of the plug assembly 100 and/or the radome 1102. For example, the protrusions 104 of the plug 102 may be resilient to allow the protrusions 104 to bend, flex, or deform inwardly when inserted into the passage between the camera 1104 and the radome 1102. At some point, the flanges 124 may spring outwardly (and into openings of the radome 1102) and rest against a ledge (e.g., a corresponding flange, etc.) or the like of the radome 1102. In particular, the substantially perpendicular surface of the flanges 124 may rest against and a surface of the radome's ledge. The resiliency of the flanges 124 allows the flanges 124 to maintain their position relative to the radome's ledge. This may be referred to as a snap fit engagement. To detach the plug assembly 100 from the radome 1102, a user forces the protrusions 104 inward and pulls the plug 102 out of the passage between the camera 1104 and the radome 1102. In other embodiments, the plug assembly 100 may be permanently attached to the radome 1102.

Additionally, the protrusions 142, 144 of the seal 106 may be used to help seal the antenna assembly 1100, hold the camera 1104 in place, etc. For example, and as shown in FIG. 11, the protrusion 142 is positioned between the plug 102 and the camera 1104 and the protrusion 144 is positioned between the plug 102 and the radome 1102. When the flanges 124 are resting against the radome's ledge (as explained above), the protrusions 142, 144 compress to create contact points on the camera 1104 and the radome 1102 to help seal the antenna assembly 1100, hold the camera 1104 in place, etc.

In some embodiments, the camera 1104 may be substantially flush with the radome 1102. For example, and as shown in FIG. 11, the camera 1104 may be positioned in the radome 1102 to ensure the camera's lens is substantially flush with the exterior surface of the radome 1102. This may allow the camera 1104 to capture a desirable viewing area without substantial obstructions from the radome 1102. In such examples, the radome 1102 may provide at least some protection for the camera 1104 (e.g., the lens of the camera, etc.) from debris, etc. Alternatively, the camera 1104 may be inset into the radome 1102 to provide additional protection for the camera 1104. This, however, may decrease the viewing area captured by the camera 1104. In other example embodiments, the camera 1104 may extend at least partially beyond the exterior surface of the radome 1102. In such examples, the viewing area captured by the camera 1104 may be increased.

Figure 12:
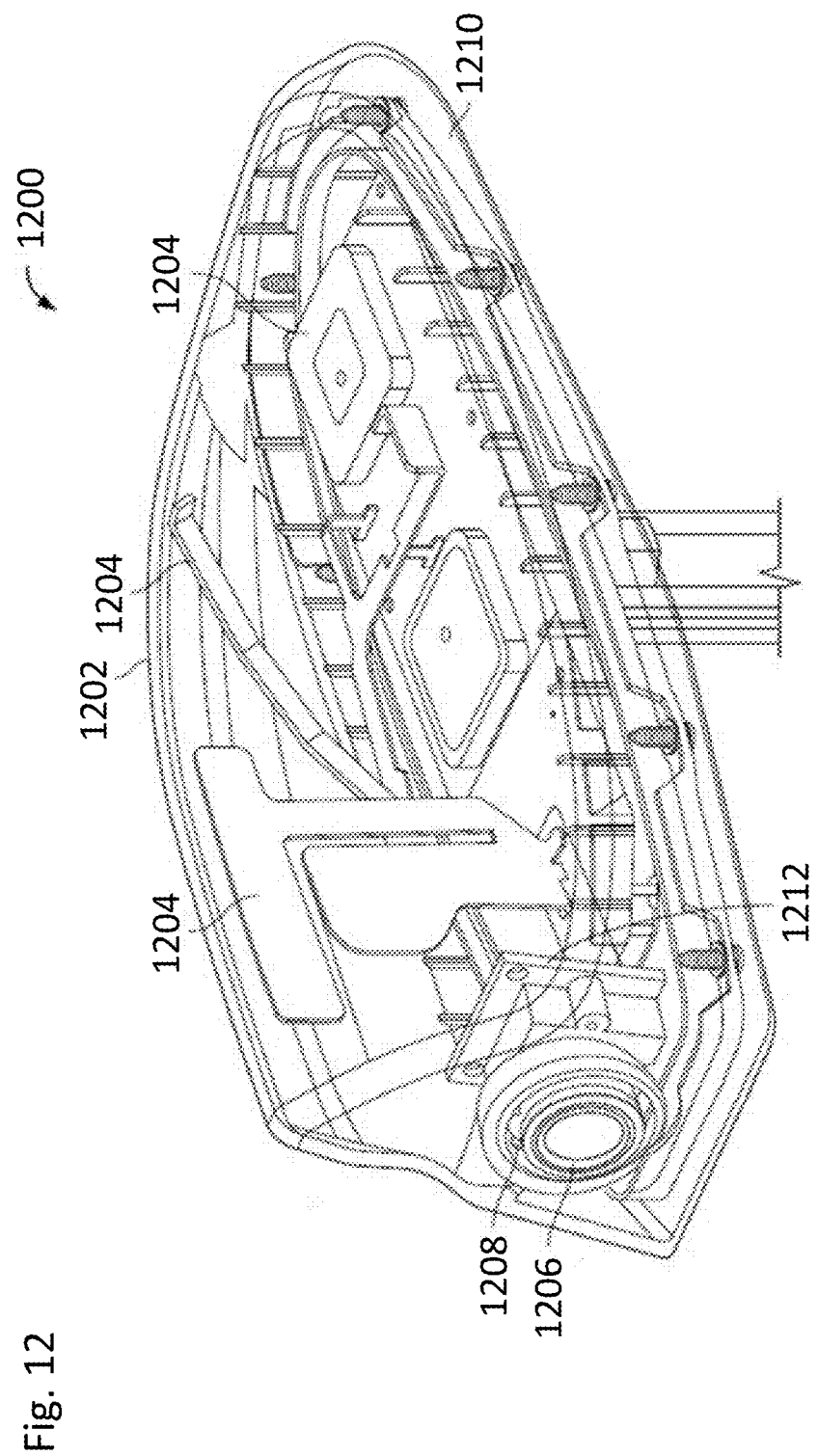
FIG. 12 is an isometric view of an antenna assembly including a radome, a camera, and a plug assembly, according to yet another example embodiment.

FIG. 12 illustrates another example antenna assembly 1200 including a camera 1206, a plug assembly 1208, and a radome 1202 for housing one or more antennas 1204. The radome 1202 defines an opening extending between its interior surface and exterior surface. As shown, the camera 1206 is positionable at least partially within the radome's opening. The plug assembly 1208 is positioned in a passage defined by the camera 1206 and the radome 1202 (as explained above). The plug assembly 1208 may be formed of any suitable plug and seal (including one of the plugs and/or seals disclosed herein).

In some example embodiments, a portion of the camera 1206 may be positioned in the radome's opening without making contact with the radome 1202. In such examples, the passage between the camera 1206 and the radome 1202 may extend substantially about the camera 1206. In particular, the passage may extend substantially about a lens, a perimeter, etc. of the camera 1206. In such examples, the plug assembly 1208 positioned in the passage may extend completely around the perimeter, the lens, etc. of the camera 1206 (and between the camera 1206 and the radome 1202).

Alternatively, a portion of the camera 1206 may be in contact with the radome 1202 adjacent the radome's opening. If so, the plug assembly 1208 may extend around portions of the perimeter of the camera 1206 not in contact with the radome 1202 to substantially prevent or inhibit contaminants from entering the antenna assembly 1200 via the passage. For example, the passage may extend about half way around the camera 1206, about a quarter of the way around the camera 1206, etc.

The antenna assemblies disclosed herein may include one or more optional features, components, functions, etc. For example, and with reference to FIG. 12, the antenna assembly 1200 may include a chassis 1210 for supporting the radome 1202 and/or one or more components of the antenna assembly 1200. For example, the components (e.g., printed circuit boards, antenna(s) such as the antennas 1204, etc.) and the radome 1202 may be coupled (e.g., attached, etc.) to one or more of the chassis' surfaces. The chassis 1210 may be coupled to a vehicle's roof and/or another suitable structure.

In some embodiments, any one of the cameras disclosed herein may be part of a camera assembly including the camera and one or more circuit boards for supporting the camera and/or attaching the camera to the radome. The circuit boards may be any suitable circuit board including, for example, rigid circuit boards, flexible circuit boards, etc. For example, and as shown in FIG. 12, the camera 1206 is coupled to a rigid printed circuit board (PCB) 1212. The rigid PCB 1212 may be coupled to other circuit boards, the radome 1202, etc. via a flexible circuit board. This configuration may allow for greater flexibility when installing the camera assembly. For example, the camera assembly may be attached to different components of its antenna assembly. The flexible circuit board may allow for a greater tolerance in the camera assembly when the camera assembly is installed.

The PCB 1212 (and/or other circuit boards of the camera assembly) may include components, traces, etc. These components may, for example, assist in capturing images, processing data, transferring data, etc. For example, the components may include a complementary metal-oxide semiconductor (CMOS) sensor for converting light (received through the camera's lens) into electrons to produce one or more images, one or more control circuits (e.g., image processor(s)) for processing data into appropriate still images, a video, etc., a power supply for providing power to the camera 1206 and the control circuits, etc.

The CMOS sensor and/or the camera 1206 may be controlled by one or more signals provided by the control circuits. In such examples, the PCB 1212 may include corresponding control interfaces for receiving and/or transmitting signals between the CMOS sensor and the control circuits. Additionally, data can be transmitted between the control circuits and the CMOS sensor via one or more signals. For example, the PCB 1212 may include corresponding camera interfaces for receiving and/or transmitting signals between the CMOS sensor and the control circuits. The control circuits can then process data received from the CMOS sensor into appropriate still images, a video, etc.

If desired, the control circuits can provide data via one or more signals to other component(s) external the antenna assembly to display the still images, the video, etc. These signals can be provided over various different interfaces including, for example, parallel interfaces, analog interfaces, digital interfaces (e.g., HDMI, etc.). For example, if the antenna assembly 1200 is employed in a vehicle, the control circuits may provide one or more signals to a rearview mirror in the vehicle, a dash display, an aftermarket display, etc. so that the images, the video, etc. can be displayed. In other embodiments, the control circuits can provide one or more signals to a system vehicle controller.

Additionally, it may be desirable to confine some or substantially all metal components on and/or in the PCB 1212 within a particular area. This may reduce interference (e.g., electromagnetic interference (EMI), etc.) between the metal components and antennas housed in a particular antenna assembly. In some embodiments, these metal components and/or the entire camera assembly may be housed in an enclosure.

Figure 13:
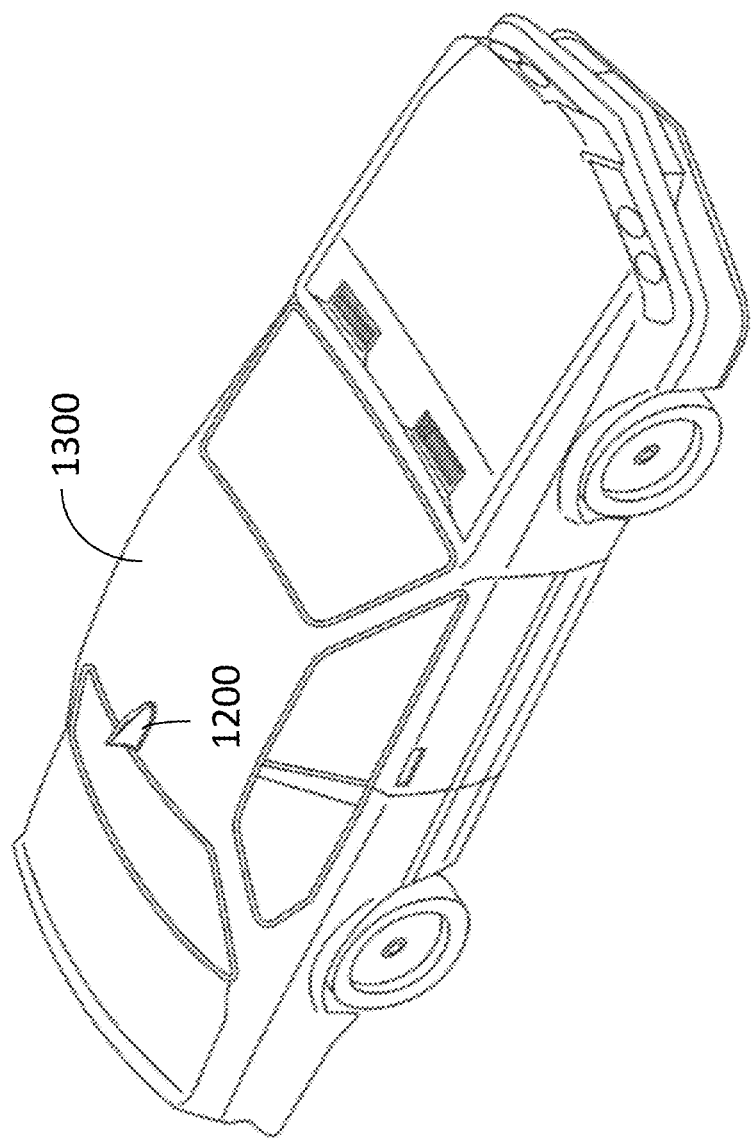
FIG. 13 is an isometric view of a car including the antenna assembly of FIG. 12, according to another example embodiment.

The antenna assemblies disclosed herein may be employed in various different applications including, for example, vehicles. In such examples, the antenna assemblies may be coupled to a vehicle. Specifically, any one of the antenna assemblies may be coupled to a roof of a vehicle near a rear portion of the roof such that the camera installed in the antenna assembly captures a view behind the vehicle. This rear view of the vehicle may be displayed on the rearview mirror and/or another suitable vehicle display as explained above. For example, FIG. 13 illustrates one example of a vehicle 1300 including the antenna assembly 1200 of FIG. 12 having its camera capturing a view behind the vehicle 1300. This configuration can provide more visibility, a larger field of view, etc. for the operator of the vehicle than a conventional rearview mirror, and therefore can replace the rearview mirror if desired.

The antenna assemblies disclosed herein may be assembled in any suitable manner. For example, an antenna assembly may be assembled by mating at least one of the coupling structure(s) (e.g., protrusion(s), opening(s), etc.) of the plug with at least one of the coupling structure(s) (e.g., protrusion(s), opening(s), etc.) of the seal to detachably couple the seal to the plug, and attaching the coupled plug and seal to a radome of the antenna assembly such that the coupled plug and seal are at least partially within an opening of the radome and at least partially surrounding a camera of the antenna assembly to substantially prevent contaminants from passing into the radome via the opening of the radome.

Additionally, the antenna assembly may be assembled by employing other optional steps. For example, the antenna assembly may be assembled by attaching the radome to a chassis of the antenna assembly such that the camera extends at least partially in the opening of the radome, snap fitting resilient coupling structure(s) to the radome (as explained herein), attaching the coupled plug and seal to the radome such that the plug is substantially flush with an exterior surface of the radome, detachably coupling the plug and seal to the radome, etc.

In some embodiments, it may be preferable to complete the steps in a particular order. For example, the radome may be attached (e.g., coupled, etc.) to the chassis, and then the coupled plug and seal may be attached to the radome.

The plugs and the seals disclosed herein may be any suitable size and/or geometric shape. For example, the plugs and/or the seals may be substantially circular or ring-shaped (as explained above), rectangular, triangular, etc. depending on the size and shape of the radome's opening, the camera, etc. In some examples, any one of the seals may have a particular outer perimeter shape to correspond to a particular plug and a particular inner perimeter shape (e.g., different than the outer perimeter shape) to correspond to a housing of the camera. Also, in some circumstances it may be preferable to mass produce the plugs and the radomes with a consistent size and/or shape for part interchangeability.

Additionally, the plugs and/or the seals may be formed of any suitable material. For example, the plugs may be made of the same or a different material than its corresponding radome. Preferably, the plugs are made from a plastic material. The seals may be formed of a flexible material to allow the seals to conform, compress, etc. to surfaces of adjacent components such as plugs, radomes, camera, etc. This may allow the seals to function as gaskets. Further, the conformability of the seals may allow the seals to absorb a tolerance of the cameras, radomes, plugs, etc. when the camera is positioned in the radome's opening. Preferably, the seals are made from a rubber (e.g., resilient) material.

The plugs and/or the seals may be formed by any other suitable process. For example, the plugs and/or the seals may be formed by injection molding (e.g., overmolding, etc.). In such examples, a plug may be formed separately from its corresponding radome, a seal may be molded separately from its corresponding plug, etc. In other embodiments, the injection molded plug may be formed on the radome by overmolding the plug onto the radome, the injection molded seal may be molded directly on the plug by overmolding, etc. Additionally, the protrusions, base, etc. of a particular plug and/or the base, ridge, etc. of a particular seal may have a monolithic construction. Alternatively, the components of the plug and/or the seal may be separately formed and then coupled together.

The cameras disclosed herein may be any suitable camera having a lens and a housing for storing the lens and/or other components of the camera. For example, the lens may be any suitable dimension and/or include various features. For example, the lens may have a diameter of about 12 mm or less, and a depth of about 15 mm or less. Additionally, the lens may have a field of view of about 180 degrees (horizontally) and about 60 degrees (vertically) depending on the position of the lens compared to the radome. Likewise, the housing may have any suitable dimension. For example, the housing may have a length and a width of about 25 mm or less, and a depth of about 8 mm or less.

The radomes disclosed herein may have any suitable size. In some examples, the radomes may be sized to house one or more antennas including, for example, cellular antennas, GPS antennas, Wi-Fi antennas, radio antennas (e.g., AM, FM, satellite antennas, etc.), etc. Additionally, the radomes may include, for example, a shark fin shape (as shown in FIGS. 12 and 13) and/or another suitable shape.

By employing one or more of the features disclosed herein, the antenna assemblies may have improved sealing capabilities and performance between a camera (e.g., a camera sensor, etc.) and a radome, an optimized camera location, an optimized tolerance, etc. compared to conventional radomes. By way of example, exemplary embodiments may be configured such that the seal (e.g., seal 106 (FIGS. 4-6), seal 706 (FIGS. 9 and 10), etc.) is compressed between the bezel (e.g., plug 102 (FIGS. 1-3), plug 702 (FIGS. 7 and 8), etc.) and radome (e.g. radome 1102 (FIG. 11), radome 1202 (FIG. 12), etc.) longitudinally along the camera's (e.g., camera 1106 (FIG. 11), camera 1206 (FIG. 12), etc.) axis and between the bezel and camera radially.

Additionally, the antenna assemblies can be provided, assembled, manufactured, etc. with a simplified process which in turn reduces costs. For example, the camera of the antenna assemblies can be installed in a relatively straight line with respect to the plug and/or the seal (if employed) to simplify the assembly or manufacturing process, reduce unnecessary wear on components (e.g., the camera, the plug, the seal, etc.), etc. compared to conventional antenna assemblies.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An antenna assembly comprising:
    a radome configured to house one or more antennas, the radome including an interior surface and an exterior surface opposing the interior surface, the radome defining an opening extending between the interior surface and the exterior surface;
    a camera positionable at least partially within the opening of the radome, the camera and the radome defining a passage between the radome and the camera when the camera is positioned at least partially within the opening of the radome; and
    a plug assembly positionable at least partially within the passage, the plug assembly including a plug having one or more first coupling structures and a seal having one or more second coupling structures, at least one of the first coupling structures and at least one of the second coupling structures mateable to detachably couple the seal to the plug to substantially prevent or inhibit contaminants from passing into the radome via the opening of the radome when the plug assembly is positioned at least partially within the passage.

2. The antenna assembly of claim 1, wherein the plug includes a base, wherein the one or more first coupling structures of the plug include one or more protrusions extending from the base of the plug, and wherein the one or more second coupling structures of the seal include one or more openings defined by the seal for receiving at least one of the one or more protrusions.

3. The antenna assembly of claim 2, wherein the seal includes a base and a ridge extending from the base, and wherein the openings are defined in the ridge of the seal.

4. The antenna assembly of claim 2, wherein the number of protrusions extending from the base is equal to the number of openings in the seal.

5. The antenna assembly of claim 2, wherein each of the one or more protrusions of the plug and each of the one or more openings defined by the seal are substantially aligned when the plug and the seal are detachably coupled.

6. The antenna assembly of claim 2, wherein the one or more protrusions are resilient to allow a snap fit engagement between the one or more protrusions and the radome.

7. The antenna assembly of claim 2, wherein the plug is ring-shaped.

8. The antenna assembly of claim 7, wherein the one or more protrusions are equally spaced about the ring-shaped plug.

9. The antenna assembly of claim 2, wherein:
the one or more protrusions include three protrusions, and the one or more openings include three openings; or
the one or more protrusions include five protrusions, and the one or more openings include five openings.

10. The antenna assembly of claim 2, wherein the one or more protrusions each include a width, and wherein the width of at least one of the one or more protrusions is different than the width of at least one other of the one or more protrusions.

11. The antenna assembly of claim 1, wherein the passage defined by the camera and the radome extends substantially about the camera.

12. The antenna assembly of claim 1, wherein the antenna assembly is configured such that the seal is compressed between the plug and the radome longitudinally along the camera's axis and between the plug and the camera radially.

13. The antenna assembly of claim 1, wherein the antenna assembly is configured to couple to a vehicle.

14. A method of coupling a plug assembly to an antenna assembly, the plug assembly including a seal and a plug, the antenna assembly including a camera and a radome defining an opening, the method comprising:
coupling at least one of one or more first coupling structures of the plug with at least one of one or more second coupling structures of the seal to detachably couple the seal to the plug; and
coupling the plug assembly to the radome such that the plug assembly is at least partially within the opening of the radome and at least partially surrounding the camera to substantially prevent or inhibit contaminants from passing into the radome via the opening of the radome.

15. The method of claim 14, wherein the plug includes a base, wherein the first coupling structures of the plug include one or more protrusions extending from the base of the plug, and wherein the second coupling structures of the seal include one or more openings defined by the seal for receiving at least one of the one or more protrusions.

16. The method of claim 14, further comprising coupling the radome to a chassis of the antenna assembly such that the camera extends at least partially in the opening of the radome.

17. The method of claim 16, wherein coupling the radome to the chassis occurs before coupling the plug assembly to the radome.

18. The method of claim 14, wherein the one or more first coupling structures are resilient, wherein the radome defines one or more additional openings, and wherein coupling the plug assembly to the radome includes snap fitting the one or more resilient first coupling structures to the radome.

19. The method of claim 14, wherein coupling the plug assembly to the radome includes coupling the plug assembly to the radome such that the plug is substantially flush with an exterior surface of the radome.

20. The method of claim 14, wherein coupling the plug assembly to the radome includes detachably coupling the plug assembly to the radome, and/or wherein the method includes compressing the seal between the plug and the radome longitudinally along the camera's axis and between the plug and the camera radially.

* * * * *